A. Pursel,
Horse Power.
N° 44,454.      Patented Sep. 27, 1864.

Witnesses.
James P. Hall.
Henry Morris

Inventor.
A. Pursel
per Munn & Co.
Attorneys

UNITED STATES PATENT OFFICE.

ABSALOM PURSEL, OF NEW VILLAGE, NEW JERSEY.

IMPROVEMENT IN BRAKES FOR HORSE-POWERS.

Specification forming part of Letters Patent No. 44,454, dated September 27, 1864.

*To all whom it may concern:*

Be it known that I, ABSALOM PURSEL, of New Village, in the county of Warren and State of New Jersey, have invented a new and Improved Automatic Brake for Horse-Powers; and I do hereby declare that the following is a full, clear, and exact description thereof, which will enable those skilled in the art to make and use the same, reference being had to the accompanying drawings, forming part of this specification, in which—

Figure 1:
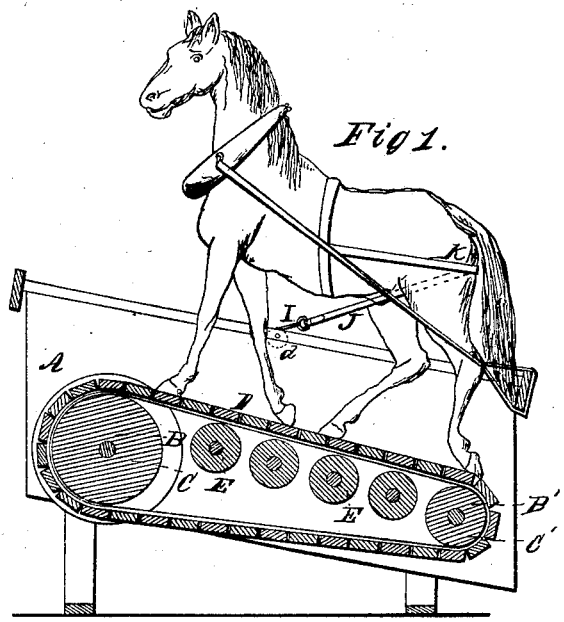
Figure 2:
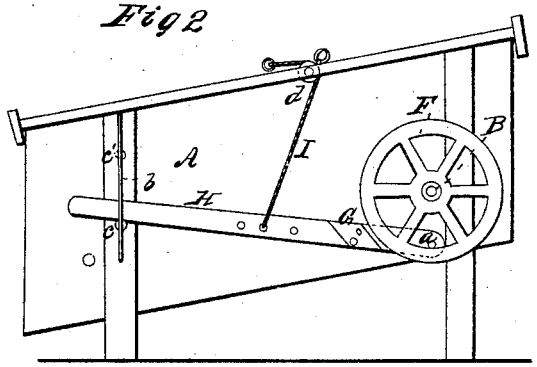

Figure 1 represents a longitudinal vertical section of my invention. Fig. 2 is a side elevation of the same.

Similar letters of reference indicate corresponding parts.

The object of this invention is to connect a brake-lever with the horse in such a manner that when the main shaft of the power is suddenly relieved from all opposing strain or resistance, as soon as the horse falls back the brake is applied.

In ordinary horse-powers of that class in which the horse or driving animal walks on an endless slatted apron constant attention is required to prevent the horse from being injured, if by some cause the main driving-pulley supporting the endless apron is suddenly relieved of all resistance by the breakage of a belt or any other accident. In that case the horse is thrown back violently and liable to be injured unless by the application of a brake the motion of the main pulley and of the endless apron is checked. The most natural and the surest way to produce this effect is that represented in the accompanying drawings, which I will now proceed to describe.

A represents a frame, which forms the bearings for the axles B B' of the drums C C', on which the endless slatted apron D is stretched. The upper section of this apron is placed in a slightly-inclined position, and it is supported by a series of rollers, E, in the usual manner. The frame A rises above the apron to form a rail for the protection of the horse or animal walking on said apron, as shown in Fig. 1. The axle of the driving-drum C extends through the side of the frame, and it serves to transmit the motion of the power to the working machines in the usual manner. Mounted on this axle and close to the side of the frame A is the brake-wheel F, and the motion of the driving axle and drum is checked by the application of the brake-shoe G to the periphery of the brake-wheel. The shoe G is rigidly attached to a lever, H, which has its fulcrum on a pivot, $a$, that is inserted in the frame, and the outer or loose end of which is guided in a rail, $b$, as clearly shown in Fig. 2. A pin, $c$, inserted in a hole in the side of the frame supports this lever in its lowest position when the brake is on; but if it is desired to apply the brake permanently, and to allow the horse to rest on the apron D, the loose end of the brake-lever is raised above the hole $c'$, and by inserting the pin into this hole the brake-shoe is pressed up against the periphery of the wheel F, and kept in contact with the same, as long as may be desirable, without requiring any further attention.

I is a rope or strap, which extends from the brake-lever H over a pulley, $d$, in the top rail of the frame A, and this strap connects by the bridging-strap J with the hip-strap K, as clearly shown in Fig. 1 of the drawings. If the horse walks along on the apron D, the bridging-strap is loose, and the strap or rope I, not being exposed to any strain, allows the brake-lever to drop down to the position shown in Fig. 2 of the drawings, and the brake is taken off; but if by some accident the apron D is suddenly relieved of a large portion of the opposing strain or of the resistance, so that the horse falls back, the strap I is instantaneously drawn up, and the brake is applied.

It is obvious that the position of the brake-lever might be changed in various ways, and its connection with the horse might be altered correspondingly.

I do not wish to confine myself, therefore, to the precise position of the brake-lever and to the connections of the same with the horse which I have shown in the drawings, but I reserve the right to change the same as long as the same result is produced.

I claim as new and desire to secure by Letters Patent—

So combining the brake-lever H and the cord I, connected to the breeching that when the horse falls back the brake is applied, and when the horse goes ahead the brake is taken off.

ABSALOM PURSEL.

Witnesses:
DANIEL HULFHIZER,
W. W. CASTNEY.